US012097595B2

(12) United States Patent
Feuerstein et al.

(10) Patent No.: US 12,097,595 B2
(45) **Date of Patent: *Sep. 24, 2024**

(54) RATCHET, RATCHET ACCESSORY, AND KIT INCLUDING THE SAME

(71) Applicant: Milwaukee Electric Tool Corporation, Brookfield, WI (US)

(72) Inventors: Jacob Feuerstein, Del Mar, CA (US); Steven W. Hyma, Milwaukee, WI (US)

(73) Assignee: Milwaukee Electric Tool Corporation, Brookfield, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/145,593

(22) Filed: Dec. 22, 2022

(65) Prior Publication Data

US 2023/0128063 A1 Apr. 27, 2023

Related U.S. Application Data

(63) Continuation of application No. 16/893,996, filed on Jun. 5, 2020, now Pat. No. 11,534,895, which is a (Continued)

(51) Int. Cl.
*B25B 13/46* (2006.01)
*B25B 13/56* (2006.01)
(Continued)

(52) U.S. Cl.
CPC .............. *B25B 13/46* (2013.01); *B25B 13/56* (2013.01); *B25B 23/0021* (2013.01); *B25H 3/003* (2013.01)

(58) Field of Classification Search
CPC .......... B25H 3/00; B25H 3/025; B25H 3/003; B25B 13/46; B25B 13/56; B25B 23/0021
See application file for complete search history.

(56) References Cited

U.S. PATENT DOCUMENTS 838,109 A 2/1906 Hanes
D59,417 S 10/1921 Graham
(Continued)

FOREIGN PATENT DOCUMENTS

CA 2938540 7/2015
CN 204686733 10/2015
(Continued)

*Primary Examiner* — David B. Thomas
(74) *Attorney, Agent, or Firm* — Reinhart Boerner Van Deuren s.c.

(57) ABSTRACT

A tool kit is provided that includes a tool including a handle and a tool head and a set of tool accessories configured to be coupled to the tool head. The tool accessories each including a drive end that is configured to be coupled to the tool head and a working end opposite the drive end. The tool kit includes a container that is movable between an open position and a closed position. The container includes a first portion including a first retainer that supports the tool, a second portion and a middle portion dividing the first portion from the second portion. The middle portion including a second retainer that supports the tool accessories and the container is selectively stored in a closed position where the middle portion supports the container on a surface in an upright position.

20 Claims, 12 Drawing Sheets

Related U.S. Application Data continuation of application No. 16/533,192, filed on Aug. 6, 2019, now Pat. No. 10,688,630, which is a continuation of application No. 15/966,158, filed on Apr. 30, 2018, now Pat. No. 10,576,611, which is a continuation of application No. 15/355,496, filed on Nov. 18, 2016, now Pat. No. 9,956,670.

(60) Provisional application No. 62/379,926, filed on Aug. 26, 2016, provisional application No. 62/366,671, filed on Jul. 26, 2016.

(51) Int. Cl.

| | |
|---|---|
| ***B25B 23/00*** | (2006.01) |
| ***B25H 3/00*** | (2006.01) |

(56) References Cited

U.S. PATENT DOCUMENTS

| | | | | | |
|---|---|---|---|---|---|
| D108,143 | S | | 1/1938 | Mandl | |
| D142,054 | S | | 8/1945 | Young | |
| 2,895,362 | A | | 7/1959 | Jamgotchian | |
| 2,977,824 | A | | 4/1961 | Rueb | |
| 3,651,720 | A | | 3/1972 | Edward | |
| 4,004,476 | A | | 1/1977 | Devrou | |
| D246,415 | S | | 11/1977 | Critcher | |
| D264,300 | S | | 5/1982 | Imm | |
| 4,328,720 | A | | 5/1982 | Shiel | |
| D274,881 | S | | 7/1984 | Wisley | |
| D275,443 | S | | 9/1984 | Snaper | |
| 4,489,628 | A | | 12/1984 | Nicastro | |
| 4,607,547 | A | | 8/1986 | Martus | |
| 4,699,029 | A | | 10/1987 | Kelly | |
| D299,613 | S | | 1/1989 | Laurie | |
| 4,798,111 | A | | 1/1989 | Cheeseman | |
| 4,800,786 | A | | 1/1989 | Arnold | |
| 4,817,475 | A | | 4/1989 | Kelly | |
| 4,825,732 | A | | 5/1989 | Arnold | |
| D303,342 | S | | 9/1989 | Katz | |
| 4,882,958 | A | | 11/1989 | Mcneeley | |
| 4,947,713 | A | | 8/1990 | Arnold | |
| 4,969,231 | A | | 11/1990 | Mader | |
| 4,970,917 | A | | 11/1990 | Mccollom | |
| 4,982,627 | A | | 1/1991 | Johnson | |
| 5,009,133 | A | | 4/1991 | Carey | |
| 5,031,488 | A | | 7/1991 | Zumeta | |
| D318,997 | S | | 8/1991 | Baker | |
| D319,562 | S | | 9/1991 | Ballard | |
| 5,048,379 | A | | 9/1991 | Gramera | |
| 5,079,978 | A | | 1/1992 | Kupfer | |
| D349,025 | S | | 7/1994 | Romero | |
| D353,756 | S | | 12/1994 | Graves | |
| 5,421,224 | A | | 6/1995 | Bond | |
| 5,423,404 | A | | 6/1995 | Shaw | |
| 5,551,320 | A | | 9/1996 | Horobec | |
| D381,247 | S | | 7/1997 | Zayat | |
| 5,664,467 | A | | 9/1997 | Breeze | |
| D385,166 | S | | 10/1997 | Mundon | |
| D390,432 | S | | 2/1998 | Shaffer | |
| 5,724,872 | A | | 3/1998 | Shih | |
| 5,782,148 | A | | 7/1998 | Kerkhoven | |
| D397,598 | S | | 9/1998 | Falk | |
| D398,823 | S | | 9/1998 | Hsieh | |
| 5,819,606 | A | | 10/1998 | Arnold | |
| D402,517 | S | | 12/1998 | Gracia | |
| 5,855,274 | A | * | 1/1999 | Piao | B25H 3/04<br>206/478 |
| 5,901,620 | A | | 5/1999 | Arnold | |
| D410,367 | S | | 6/1999 | Applegate | |
| 5,943,924 | A | | 8/1999 | Jarvis | |
| 5,957,012 | A | | 9/1999 | Mccune | |
| 5,960,682 | A | | 10/1999 | Yamashita | |
| 6,047,618 | A | | 4/2000 | Pieri | |
| D425,385 | S | | 5/2000 | Jarvis | |
| D425,770 | S | | 5/2000 | Hsieh | |
| D426,130 | S | | 6/2000 | Boukhny | |
| 6,109,436 | A | * | 8/2000 | He | B25H 3/023<br>206/378 |
| 6,178,854 | B1 | | 1/2001 | Shih | |
| D437,537 | S | | 2/2001 | Carter | |
| D438,767 | S | | 3/2001 | Luxon | |
| D442,837 | S | | 5/2001 | Porras | |
| 6,282,994 | B1 | | 9/2001 | Wei | |
| 6,321,625 | B1 | | 11/2001 | Fernandez | |
| 6,397,706 | B1 | | 6/2002 | Maznicki | |
| 6,398,027 | B1 | * | 6/2002 | Ryu | A45C 11/008<br>206/362 |
| D459,961 | S | | 7/2002 | Carroll | |
| 6,415,922 | B1 | * | 7/2002 | Lee | B25H 3/003<br>220/528 |
| D464,545 | S | | 10/2002 | Marty | |
| D466,766 | S | | 12/2002 | Marty | |
| D477,198 | S | | 7/2003 | Staton | |
| 6,626,067 | B1 | | 9/2003 | Iwinski | |
| D489,589 | S | | 5/2004 | Wiljanen | |
| 6,761,093 | B2 | | 7/2004 | Chang | |
| 6,951,156 | B2 | | 10/2005 | Garg | |
| 7,036,401 | B2 | | 5/2006 | Carroll | |
| 7,127,969 | B2 | | 10/2006 | Hsieh | |
| D550,049 | S | | 9/2007 | Peng | |
| 7,270,034 | B2 | | 9/2007 | Hu | |
| D552,442 | S | | 10/2007 | Hutchings | |
| 7,281,452 | B2 | | 10/2007 | Chang | |
| 7,406,895 | B1 | | 8/2008 | Hu | |
| D584,118 | S | | 1/2009 | Halstead | |
| 7,780,016 | B1 | * | 8/2010 | Cornwell | B25H 3/003<br>211/69 |
| D630,920 | S | | 1/2011 | Smith | |
| D632,149 | S | | 2/2011 | Li | |
| 7,878,091 | B2 | | 2/2011 | Abel et al. | |
| 8,205,529 | B1 | | 6/2012 | Laurie | |
| 8,505,720 | B2 | | 8/2013 | Huang | |
| 8,528,450 | B2 | | 9/2013 | Lan | |
| 9,027,445 | B2 | | 5/2015 | Sumg | |
| 9,186,789 | B2 | * | 11/2015 | Wang | B65D 25/10 |
| D750,457 | S | | 3/2016 | Li | |
| D761,630 | S | | 7/2016 | Li | |
| 9,616,563 | B2 | | 4/2017 | Vilkormirski et al. | |
| 9,956,670 | B2 | | 5/2018 | Feuerstein | |
| 10,576,611 | B2 | * | 3/2020 | Feuerstein | B25B 23/0021 |
| 10,688,630 | B2 | * | 6/2020 | Feuerstein | B25B 13/56 |
| 11,534,895 | B2 | * | 12/2022 | Feuerstein | B25B 13/46 |
| 2002/0092786 | A1 | * | 7/2002 | Shu | B25H 3/003<br>206/379 |
| 2003/0126960 | A1 | | 7/2003 | Chen | |
| 2005/0098001 | A1 | | 5/2005 | Walker | |
| 2008/0121073 | A1 | | 5/2008 | Williams | |
| 2009/0145268 | A1 | | 6/2009 | Laurie | |
| 2009/0288522 | A1 | | 11/2009 | Tseng | |
| 2010/0018360 | A1 | | 1/2010 | Shyu | |
| 2010/0089207 | A1 | | 4/2010 | Salanda | |
| 2012/0031242 | A1 | | 2/2012 | Li et al. | |
| 2012/0060656 | A1 | | 3/2012 | Chang | |
| 2014/0182423 | A1 | | 7/2014 | Liu | |
| 2015/0114186 | A1 | | 4/2015 | Ou | |
| 2015/0251309 | A1 | | 9/2015 | Chao-Ming | |
| 2017/0001300 | A1 | | 1/2017 | Abel et al. | |
| 2019/0118366 | A1 | * | 4/2019 | Smallwood | B25H 3/003 |

FOREIGN PATENT DOCUMENTS

| | | |
|---|---|---|
| CN | 106061686 | 10/2016 |
| DE | 19541786 | 8/2004 |
| DE | 202014106037 | 1/2015 |
| DE | 102014106037 | 7/2016 |
| EP | 0165237 | 9/1991 |
| EP | 0955129 | 3/2002 |
| EP | 0934140 | 7/2002 |
| EP | 0976502 | 7/2002 |
| EP | 0939686 | 8/2002 |
| GB | 2275637 | 3/1996 |

(56) References Cited

FOREIGN PATENT DOCUMENTS

| | | |
|---|---|---|
| JP | 2017510467 | 4/2014 |
| TW | M503985 | 7/2015 |
| WO | WO2015104167 | 7/2015 |

* cited by examiner

RATCHET, RATCHET ACCESSORY, AND KIT INCLUDING THE SAME

CROSS-REFERENCE TO RELATED APPLICATIONS

The present application is a continuation of U.S. patent application Ser. No. 16/893,996, filed Jun. 5, 2020, which is a continuation of U.S. patent application Ser. No. 16/533,192, filed Aug. 6, 2019, which issued as U.S. Pat. No. 10,688,630 on Jun. 23, 2020, which is a continuation of U.S. patent application Ser. No. 15/966,158, filed Apr. 30, 2018, which issued as U.S. Pat. No. 10,576,611 on Mar. 3, 2020, which is a continuation of U.S. patent application Ser. No. 15/355,496, filed Nov. 18, 2016, which issued as U.S. Pat. No. 9,956,670 on May 1, 2018, which claims priority to U.S. Provisional Patent Application No. 62/379,926 filed on Aug. 26, 2016 and to U.S. Provisional Patent Application No. 62/366,671 filed on Jul. 26, 2016, which are incorporated by reference in their entireties.

FIELD OF THE INVENTION

The present invention relates to a tool, accessories for use with the tool, and a kit including the tool and the accessories. In particular, the present invention relates to a ratchet, accessories for use with the ratchet, and a kit including the ratchet and the accessories.

SUMMARY OF THE INVENTION

The present invention provides, in one aspect, a tool accessory including a first portion and a second portion. The first portion includes a first end having a first aperture, and the second portion includes a second end including a second aperture. A planar side surface is defined on the first portion, and a tipping point is disposed between the first portion and the second portion. The tool accessory has a center of mass that is defined at a location closer to the first end than the second end such that, when the tool accessory is rested on a surface, the center of mass causes the tool accessory to rest on a portion of the planar side surface and the tipping point.

The present invention provides, in another aspect, a tool accessory including a first portion having a drive end that is configured to be coupled to a tool head, and a second portion including a working end that is opposite the drive end. A planar side surface is defined on the first portion, and a tipping point disposed between the first portion and the second portion. The tipping point has an outer dimension that is larger than an outer dimension of the planar side surface. The tool accessory has a center of mass defined closer to the drive end than to the working end such that, when the tool accessory is rested on a surface, the center of mass causes the tool accessory to rest on a portion of the planar side surface and the tipping point.

The present invention provides, in another aspect, a tool kit including a tool including a handle and a tool head, a set of tool accessories configured to be coupled to the tool head, the tool accessories each including a drive end that is configured to be coupled to the tool head and a working end opposite the drive end, and a container that movable between an open position and a closed position. The container includes a first portion including a first retainer that supports the tool, a second portion, and a middle portion dividing the first portion from the second portion. The middle portion includes a second retainer that supports the tool accessories. The container is stored in a closed position where the middle portion supports the container on a surface in an upright position.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 5:
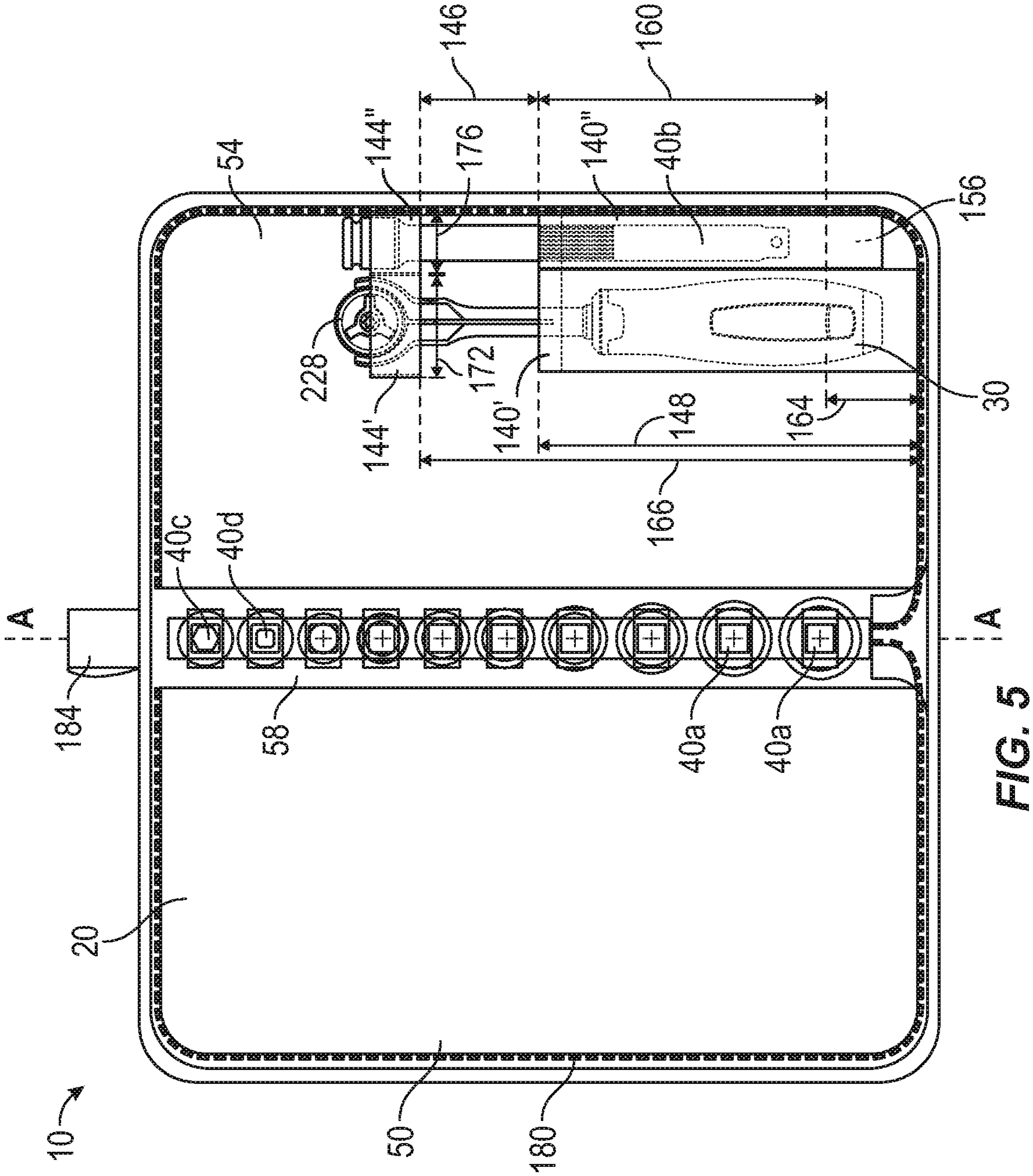
FIG. 5 is a top view of the kit of FIG. 1A, FIG. 1B, and FIG. 1C.
Figure 6:
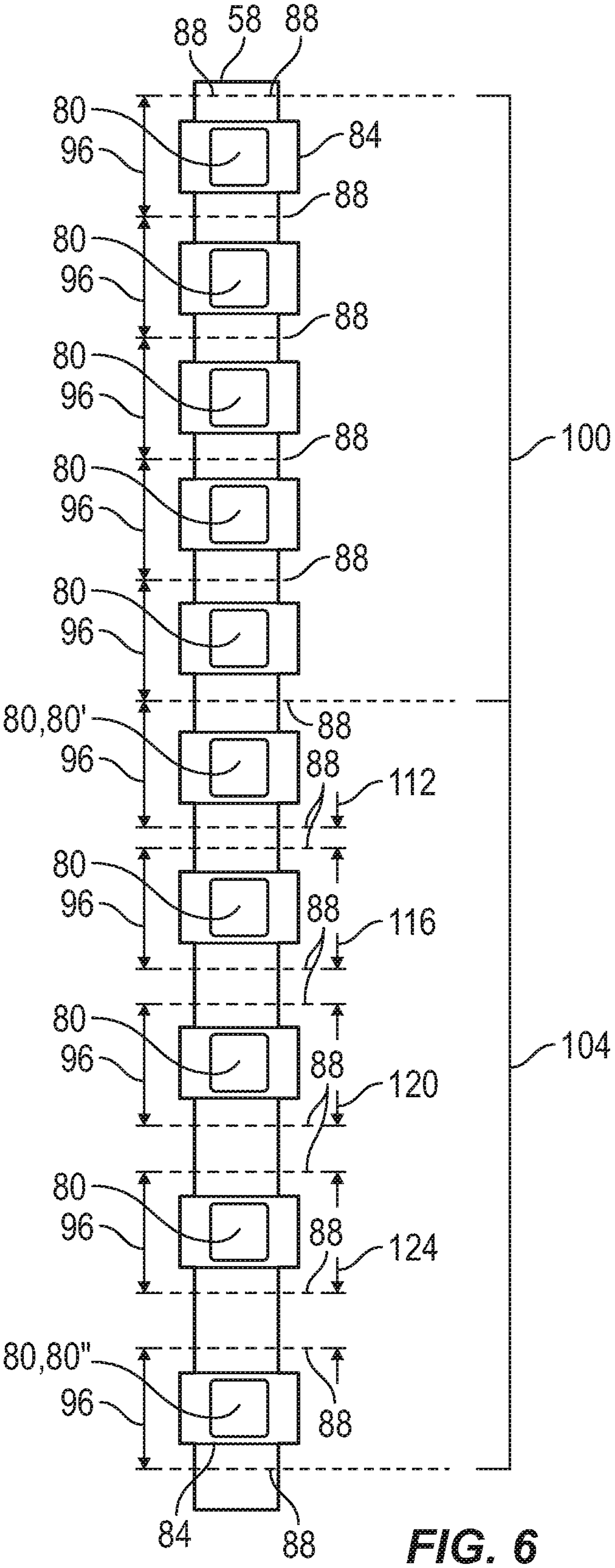
FIG. 6 is a top view of a portion of the container of FIG. 1A, FIG. 1B, and FIG. 1C.
Figure 7:
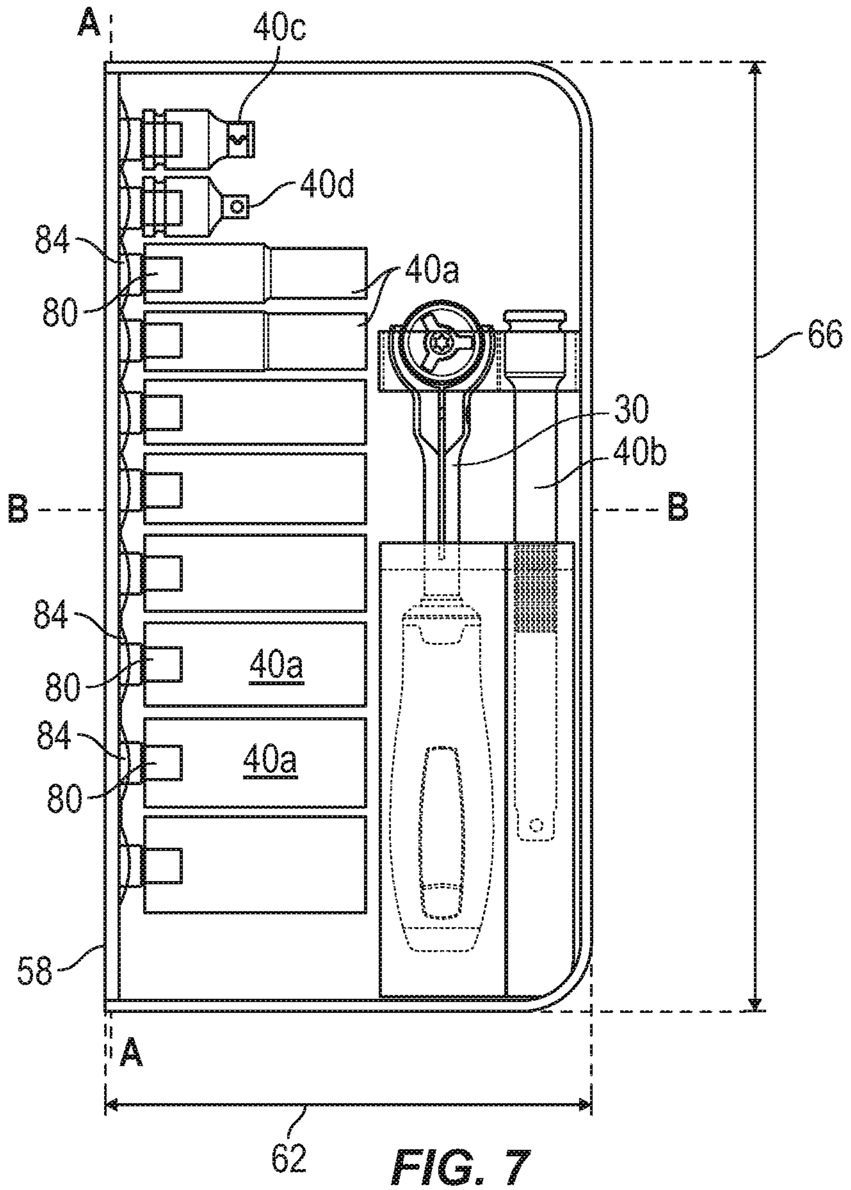
FIG. 7 is side view of the kit of FIG. 1A, FIG. 1B, and FIG. 1C with a portion being removed.
Figure 8:
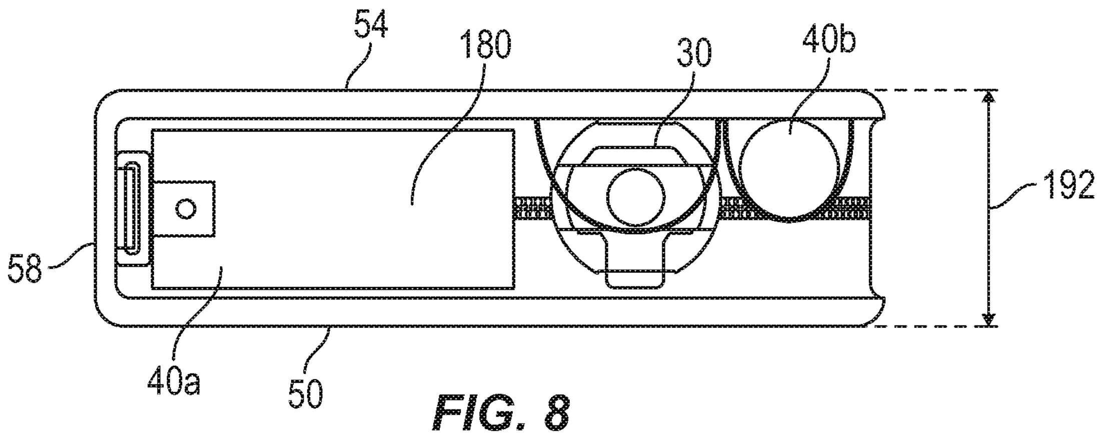
FIG. 8 is another side view of the kit of FIG. 1A, FIG. 1B, and FIG. 1C with another portion being removed.
Figure 9:
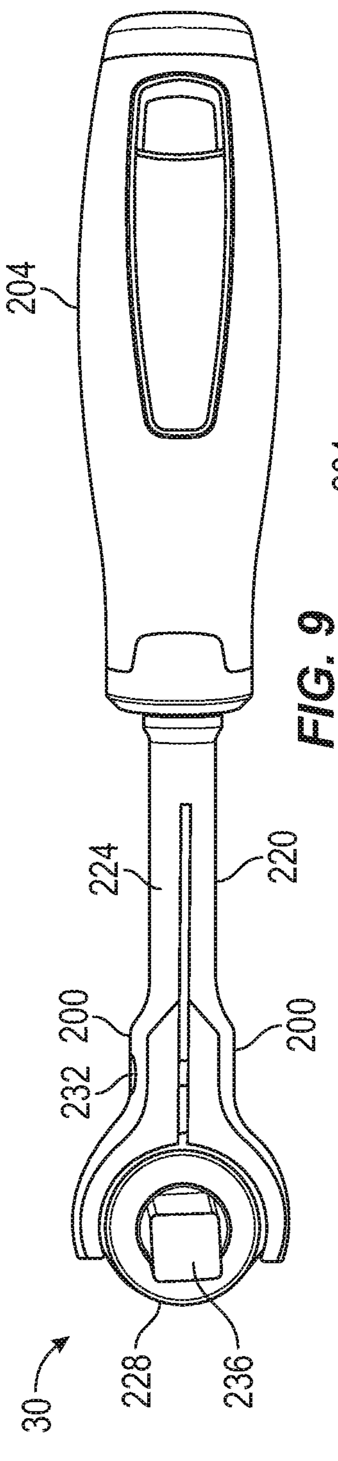
FIG. 9 is a side view of the tool of FIG. 1A, FIG. 1B, and FIG. 1C.
Figure 10:
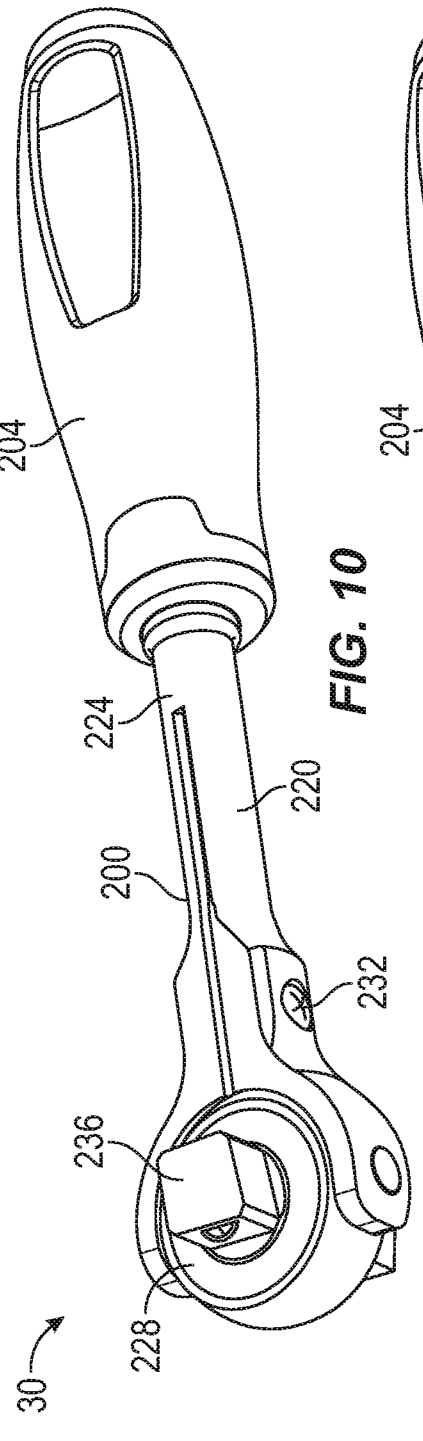
FIG. 10 is a perspective view of the tool shown in FIG. 9.
Figure 11:
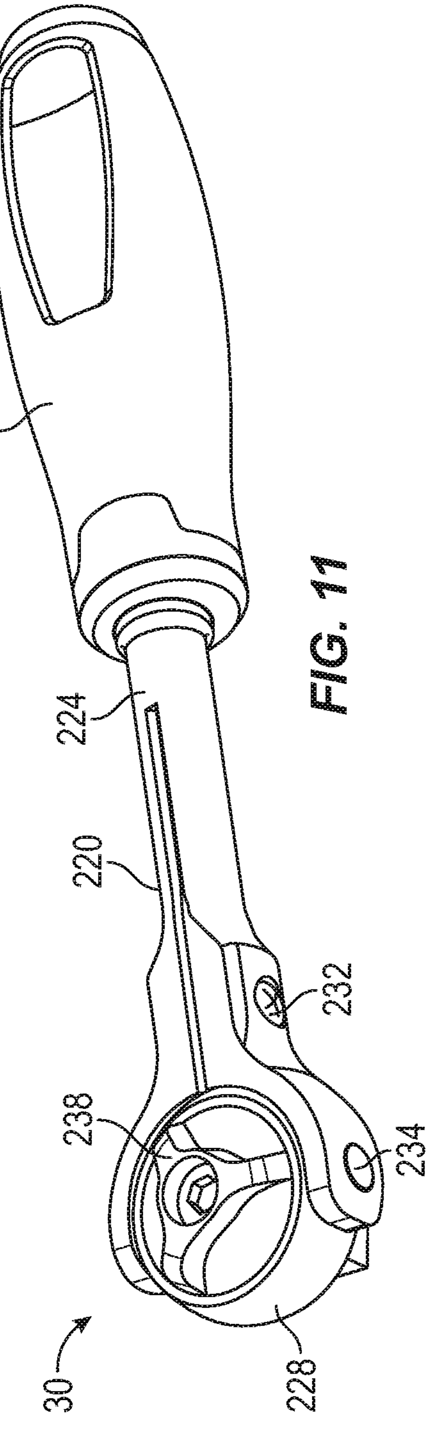
FIG. 11 is another perspective view of the tool shown in FIG. 9.

FIGS. 1*a*-1*c*, 5, and 7 illustrate kit 10 including a container or pouch 20, a tool 30, and accessories 40. The container 20, which is a pouch in the illustrated embodiment, includes a first portion 50, a second portion 54, and a middle portion 58 that is positioned between the first portion 50 and the second portion 54. The middle portion 58 defines a longitudinal axis A (FIGS. 5 and 7). Each of the first and the second portions 50, 54 has a width 62 of about 5.50 inches (about 140 mm) and a length 66 of about 10.70 inches (about 273 mm), although the width 62 may be between about 4.70 inches and 6.30 inches (about 120 mm and 160 mm) and the length 66 may be between about 9.80 inches and 11.81 inches (about 250 mm and 300 mm).

Further with respect to FIGS. 3*a*-3*b*, 6, and 7, projections 80 are coupled to the middle portion 58 and extend along the longitudinal axis A. The projections 80 each have a longitudinal axis B (FIG. 7), which is oriented perpendicular to the longitudinal axis A. In the illustrated embodiment, container 20 includes ten projections, but there may be fewer or more projections in other embodiments. Further, in the illustrated embodiment each of the projections 80 includes a base 84 (e.g., a plastic insert, FIGS. 6 and 7) that couples the projection 80 to the middle portion 58. In additional or alternative embodiments, the projections may be coupled directly to the middle portion or the plurality of projections may be coupled to a single base that couples the projections to the middle portion. Each of the projections 80 is defined by boundary lines 88. The distance 96 between the boundaries lines 88 is about 0.8 inches (about 20.5 mm), although the distance 96 may be between about 0.59 inches and about 0.98 inches (15 mm and 25 mm). A first subset 100 of the projections 80 shares boundary lines 88. A second subset 104 of the projections 80 includes a gap between adjacent boundary lines 88 that gets gradually larger from a central-most projection 80' to a distal-most projection 80". For example, a first gap distance 112 is about 0.1 inches (about 2.54 mm). A second gap distance 116 is about 0.2 inches (about 5.0 mm). A third gap distance 120 is about 0.3 inches (about 7.6 mm). A fourth gap distance 124 is about 0.35 inches (about 8.9 mm).

As shown in FIGS. 1*a*-1*c*, 3*a*-3*b*, 5 and 7, the container 20 further includes a first retainer 140 and a second retainer 144. Each of the first and second retainers 140, 144 includes a pocket 140', 144' and a retaining member 140", 144" that is spaced apart from the pocket 140', 144'. The first and the second retainer members 140", 144" are spaced apart from the first and second pockets 140', 144', respectively, by a distance 146 of about 1.49 inches (about 38 mm), although the distance 146 may be between about 1.18 inches and 1.82 inches (about 30 mm and 46 mm). The first and the second pockets 140', 144' each have a length 148 of about 5.11 inches (about 130 mm), although the pockets 140', 144' may have a length 148 of between about 4.92 inches and 5.31 inches (about 125 mm and 135 mm). The first pocket 140' has a depth that extends substantially the entire length 148 of the pocket 104', whereas the second pocket 144' includes an insert 156 that restricts the depth 160 of the pocket 144'. The length 164 of the insert 156 is 1.31 inches (about 33.5 mm), although the length 164 may be about 1.12 inches and 1.52 inches (about 28.5 mm and 38.5 mm). Accordingly, the depth 160 of the second pocket 144' is restricted to about 3.8 inches (about 96.5 mm), or may range from about 3.6 inches to 4.0 inches (about 91.5 mm to 101.5 mm). As illustrated in FIG. 5, the first and the second retainers 140, 144 extend for a length 166 that is about 6.61 inches (about 168 mm) in the illustrated embodiment, although in other embodiments the length 166 could be between about 6.22 inches and 7.00 inches (about 158 mm and 178 mm). The first and the second retainer members 140", 144" are constructed from an elastic material and have widths 172, 176 of about 0.74 inches and 0.50 inches (about 19 mm and about 12.7 mm), respectively. The widths 172, 176 may range from between about 0.55 inches to 0.95 inches (about 14 mm and 24 mm) and between about 0.30 inches and 0.70 inches (about 7.7 mm and 17.7 mm), respectively. In the illustrated embodiment the first and the second retainers 140, 144 are both coupled to the second portion 54, but in additional or alternative embodiments, the first and the second retainers 140, 144 may both be positioned on the first portion 50 or they may be separated such that one of the retainers 140, 144 is on the first portion 50 and the other retainer 140, 144 is on the second portion 54. Other embodiments may include fewer or more retainers.

Figure 1A:
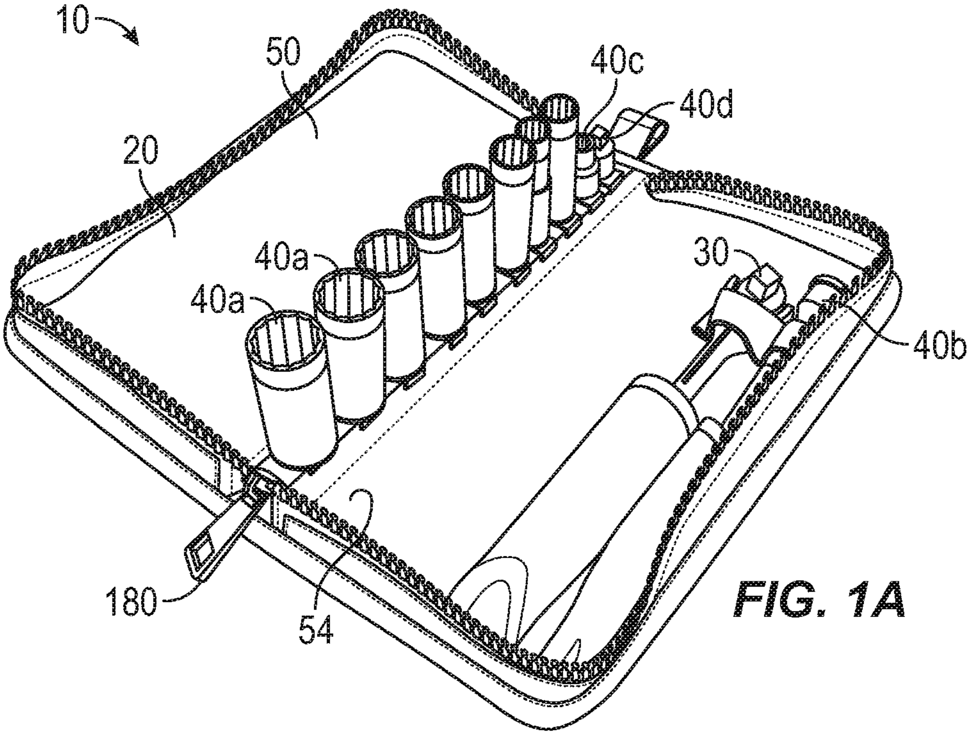
FIG. 1A, FIG. 1B, and FIG. 1C are perspective views of a kit including a container, a tool, and tool accessories.
Figure 1B:
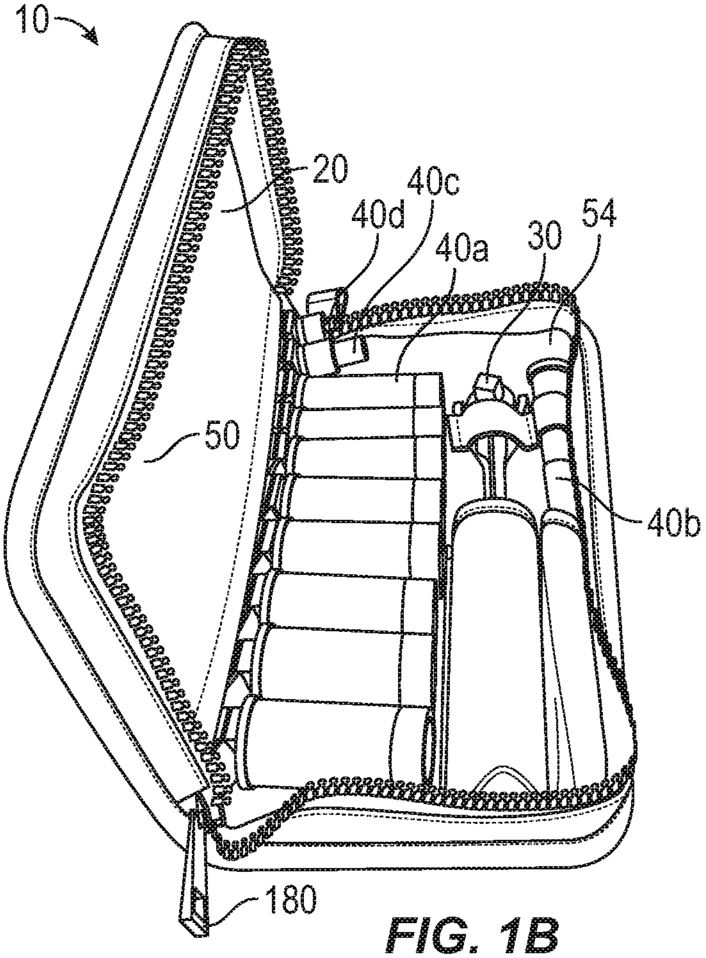
Figure 1C:
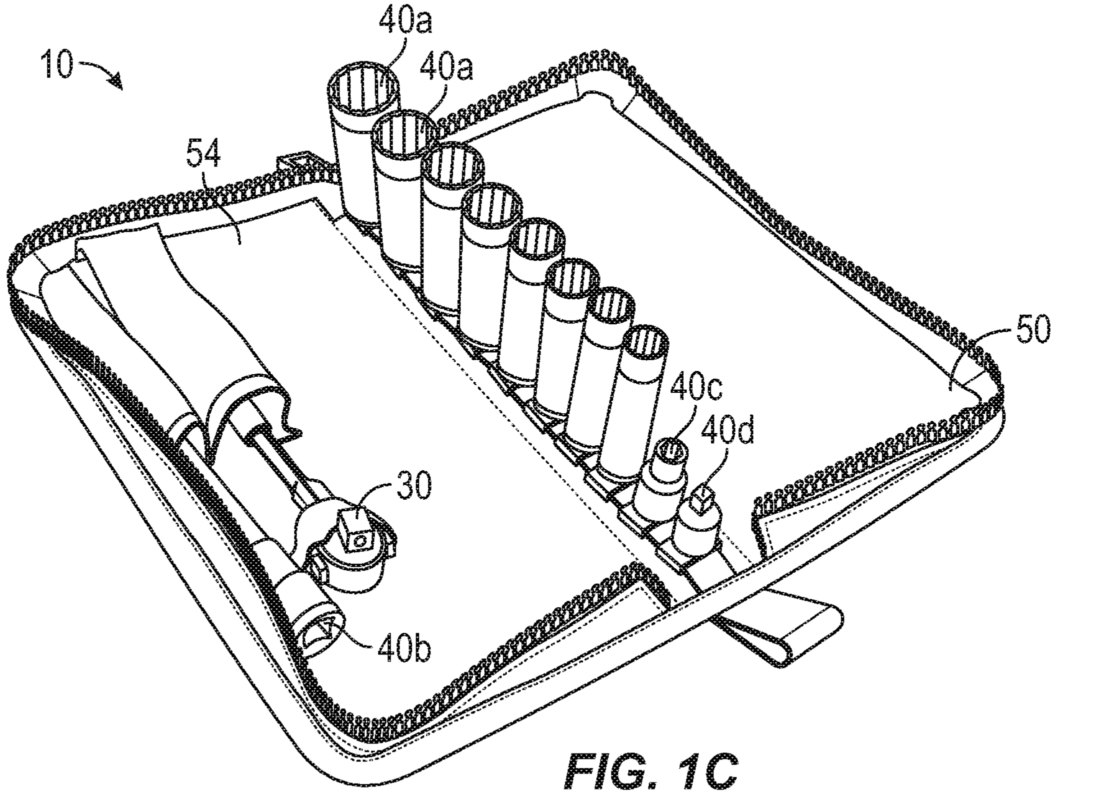
Figure 2:
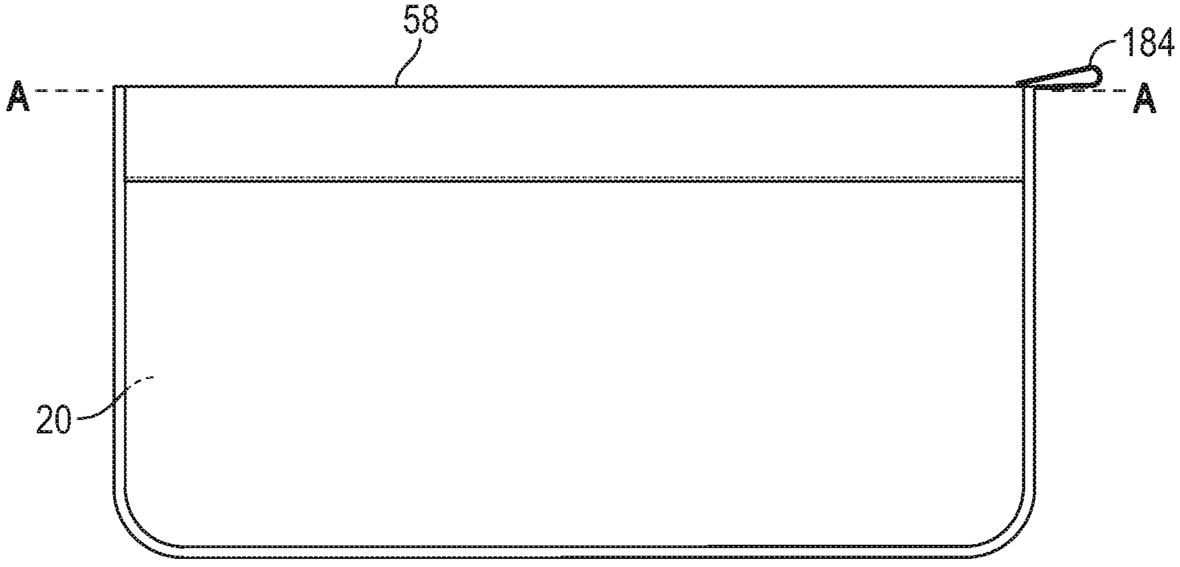
FIG. 2 is a side view of the container of FIG. 1A, FIG. 1B, and FIG. 1C.
Figure 3A:
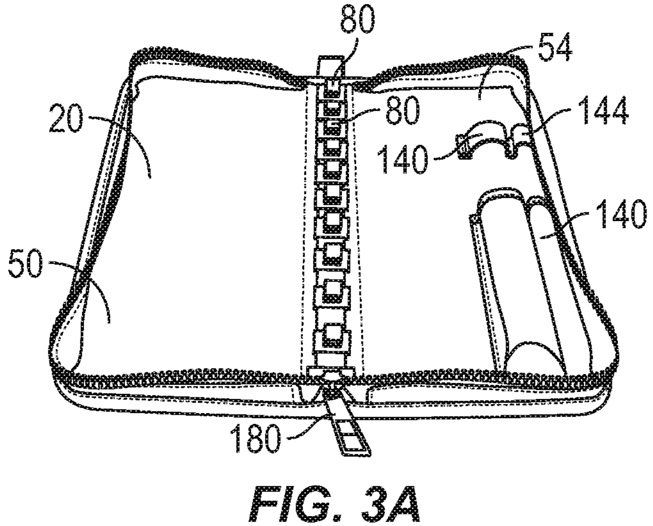
FIG. 3A and FIG. 3B are perspective views of the container of FIG. 1A, FIG. 1B, and FIG. 1C in an open position.
Figure 3B:
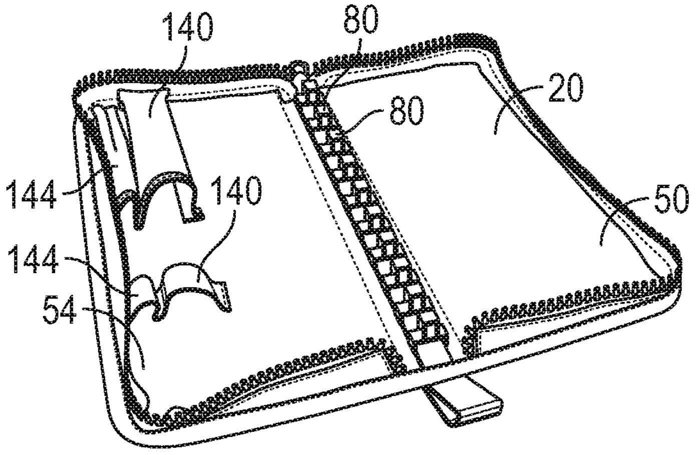
Figure 4:
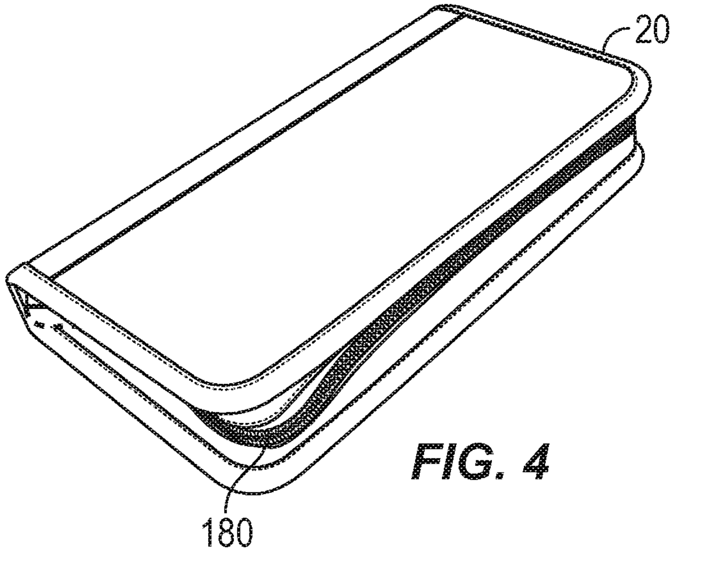
FIG. 4 is a perspective view of the container of FIG. 1A, FIG. 1B, and FIG. 1C in a closed position.

The container 20 includes a fastener 180 that selectively secures the first portion 50 to the second portion 54. In the illustrated embodiment the fastener 180 is a zipper, but other suitable types of fasteners may couple the first and second portions 50, 54 in other embodiments. The container 20 also includes a loop 184 to assist in transporting the kit 10. The loop 184 has a diameter 188 of about 0.88 inches (about 22.5 mm), although it may be between about 0.78 inches and 0.99 inches (about 20 mm and 25 mm). The container 20 has a first, open position (FIGS. 3*a*-3*b*) in which the first and second portions 50, 54 are not secured to one another and a second, closed position (FIGS. 2 and 4) in which the first and the second portions 50, 54 are secured to one another. In the closed position, the width of the middle portion 58 is substantially the same as the distance 192 between the first and the second portions 50, 54 which is about 1.49 inches (about 38 mm), although the distance may be between about 1.18 inches and 1.81 inches (about 30 mm and 46 mm). As discussed in greater detail below, the configuration of the middle portion 58 allows the accessories 40 to be stored in a standing or upright position.

Figure 12:
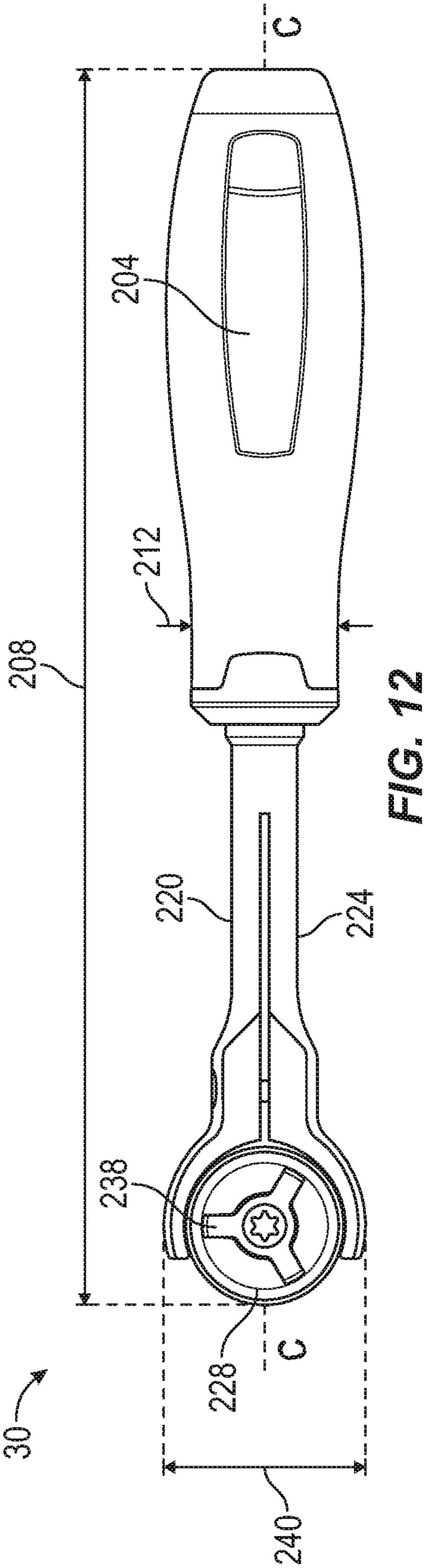
FIG. 12 is a top view of the tool shown in FIG. 11.
Figure 14:
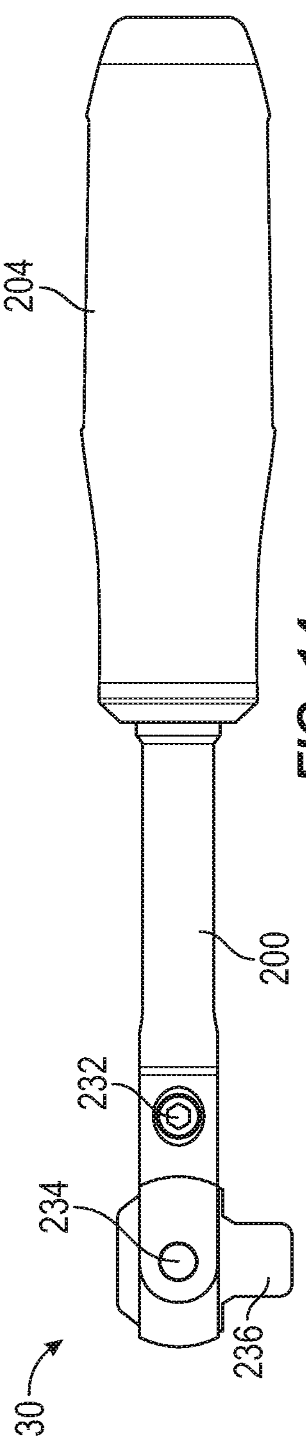
FIG. 14 is a side view of the tool shown in FIG. 9.
Figure 16:
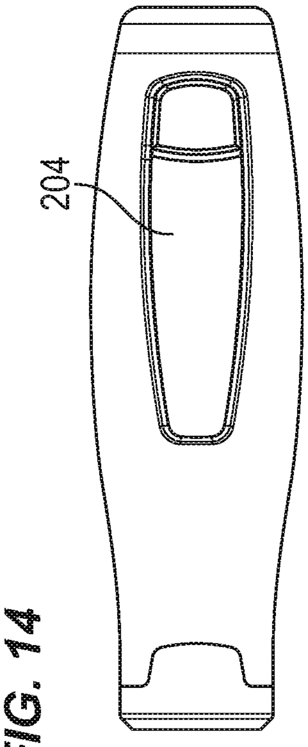
FIG. 16 is a bottom view of a handle of the tool shown in FIG. 9, FIG. 12, and FIG. 14.
Figure 15:
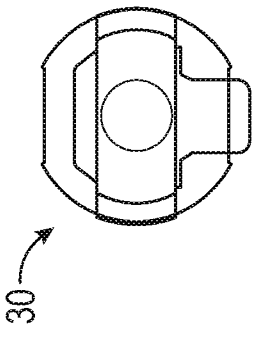
FIG. 15 is an end view of the tool shown in FIG. 14.
Figure 13:
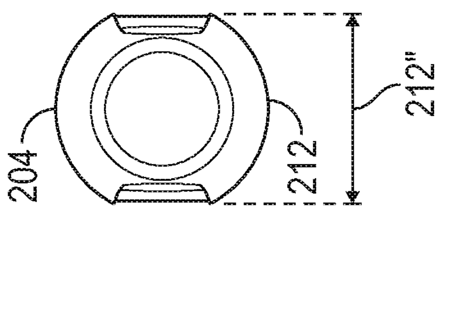
FIG. 13 is an end view of the tool shown in FIG. 12.

Further with respect to FIGS. 1*a*-1*c*, 5, 7, and 9-16, the tool 30 is a ratchet, although in other embodiments the tool 30 may be of another type. The ratchet 30 defines a longitudinal axis C (FIG. 12) and includes a body 200 that is coupled to a handle 204. The body 200 and the handle 204 are aligned along the longitudinal axis C. A length 208 of the ratchet is about 7.4 inches (about 187 mm), although the length 208 may be between about 5.0 inches and 20.0 inches (about 188 mm and 508 mm). The handle 204 has a variable diameter 212. A first or narrowest diameter 212' of the handle 204 is about 0.85 inches (about 22 mm), although the narrowest diameter 212' may be between 0.5 inches and 1.5 inches (about 12 mm and 39 mm), and a second or widest diameter 212" is about 1.2 inches (30 mm), although the widest diameter 212" may be between about 0.85 inches and 1.8 inches (about 215 mm and 46 mm). The body 200 includes a first portion 220 and a second portion 224. A head 228 of the tool 30 is movably coupled between the first and the second portions 220, 224 by fastener 232. In the illustrated embodiment, the head 228 pivots or rotates about a pin 234, which extends perpendicular to the longitudinal axis C. The head 228 includes projections 236, 238. The projection 236 is square shaped in this embodiment, but may be other suitable shapes in other embodiments. The projection 238 has three points in this embodiment, but may be other appropriate shapes or not be included at all in other embodiments. The head 228 has a diameter 240 of about 0.97 inches (about 95 mm), although the diameter 240 may be between about 0.5 inches and 1.5 inches (about 12 mm and 39 mm). The ratchet 30 is assembled by moving the first and second portions 220, 224 slightly away from one another to allow the head 228 to be positioned therebetween. The fastener 232 is tightened to movably secure the head 228 to the body 200.

Further, with respect to FIGS. 1*a*-1*c*, 5, 7, and 17-25 the accessories 40 include socket accessories 40*a*, an extension accessory 40*b*, a first adapter accessory 40*c*, and a second adapter accessory 40*d*.

FIGS. 7 and 17-28 illustrate that each of the socket accessories 40*a* include a body 300 having a longitudinal axis D (FIG. 17), a first end or portion 304, and a second end or portion 308. The first end 304 includes one or more side faces 312 and an aperture 316 (FIGS. 17 and 19) that extends along the longitudinal axis D. The side faces 312 each include a first section or planar side surface 312*a* extending from the first end 304 toward the second end 308, and a second section or angled wall 312*b* that is continuous with the first section 312*a* and disposed at an oblique angle relative to the first section 312*a*. Each of the first section 312*a* and the second section 312*b* are substantially planar. The aperture 316 defines a square opening or drive 320 (FIG. 19) on the first end 304 that is configured to receive, for example, the projection 236 of the head 228.

In the embodiment of FIGS. 7 and 17-24, the second end 308 is substantially cylindrical with a constant diameter and includes an aperture 324 configured to, for example, engage a workpiece. In the embodiment illustrated in FIG. 20, the center of mass 330 of each socket accessory 40*a* is closer to the first end 304 than the second end 308 such that each socket accessory 40*a* rests on one of the side faces 312 when not in use, which prevents each socket accessory 40*a* from the rolling. In other embodiments, the center of mass 330 may be located elsewhere relative to the first and the second ends 304, 308, as will be discussed in greater detail below.

Figure 26:
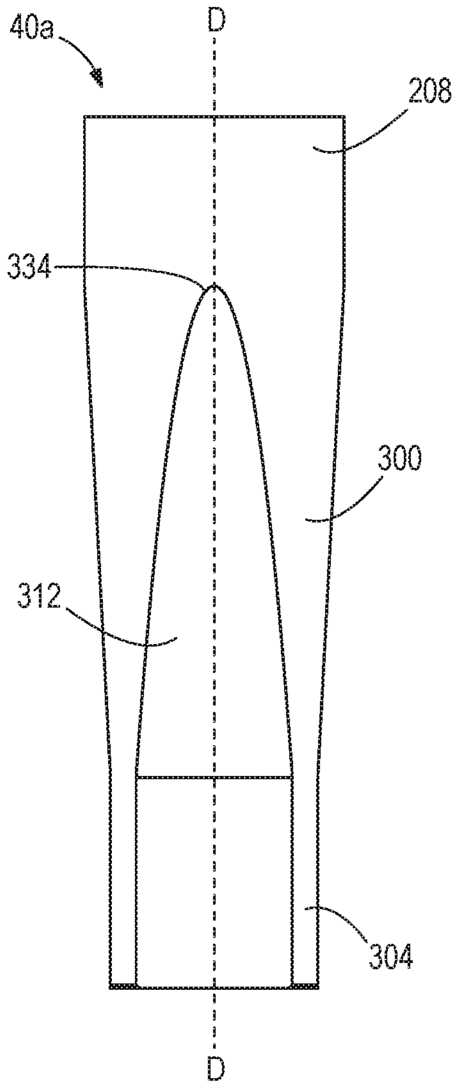
FIG. 26 is a side view of another tool accessory.
Figure 27:
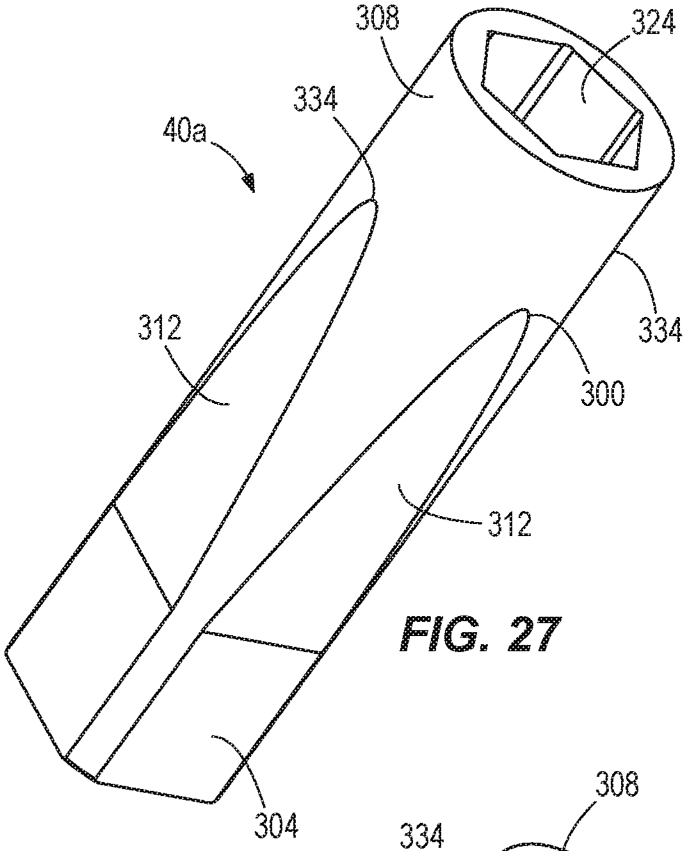
FIG. 27 and FIG. 28 are perspective views of the tool accessory of FIG. 26.
Figure 28:
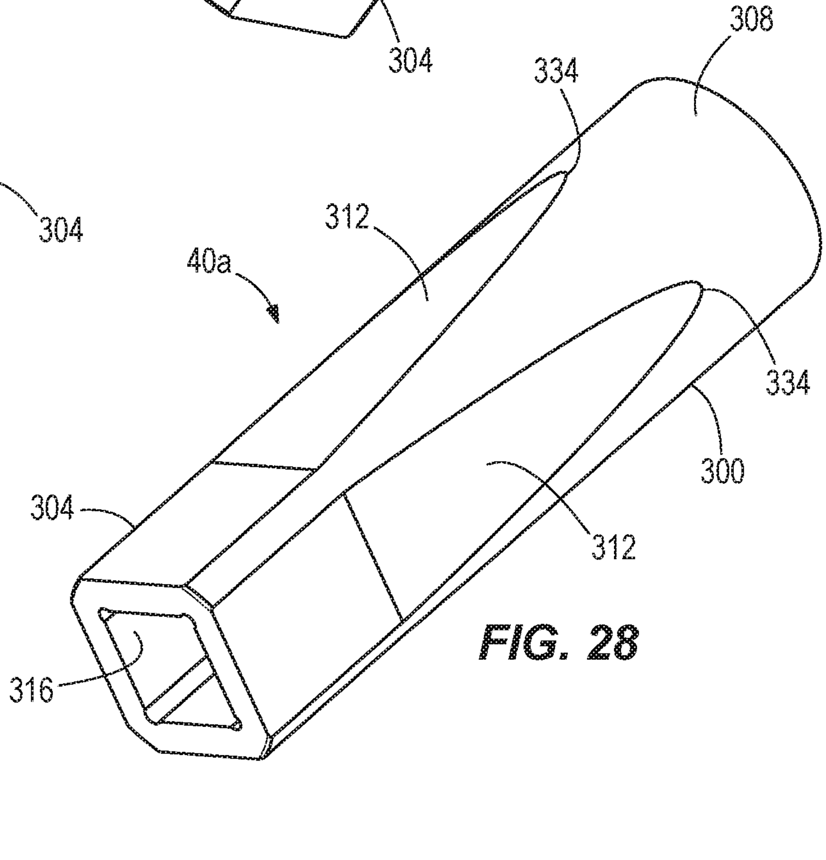

Like the embodiments of FIGS. 7 and 17-24, the embodiment of FIGS. 26-28 includes the aperture 316 on the first end 304 and the aperture 324 on the second end 308. However, in this embodiment, the second end 308 of one or more socket accessories 40*a* is cylindrical with a diameter that decreases in a direction toward the first end 304.

Figure 18:
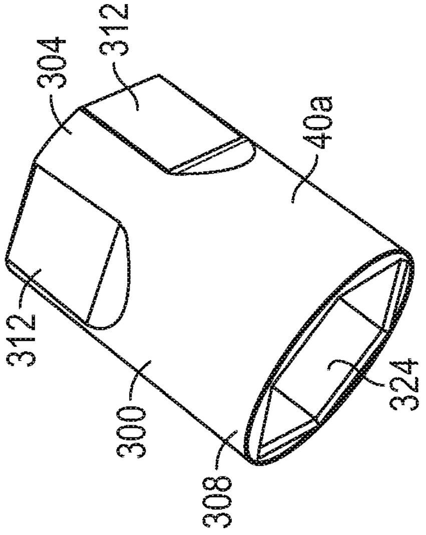
FIG. 18 is a perspective view of the tool accessory of FIG. 17.
Figure 20:
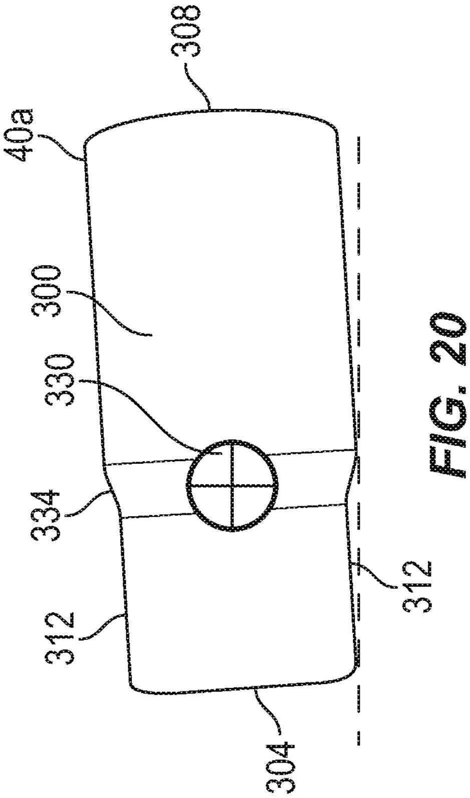
FIG. 20 is a side view of another one of the tool accessories of FIG. 1A, FIG. 1B, and FIG. 1C.
Figure 17:
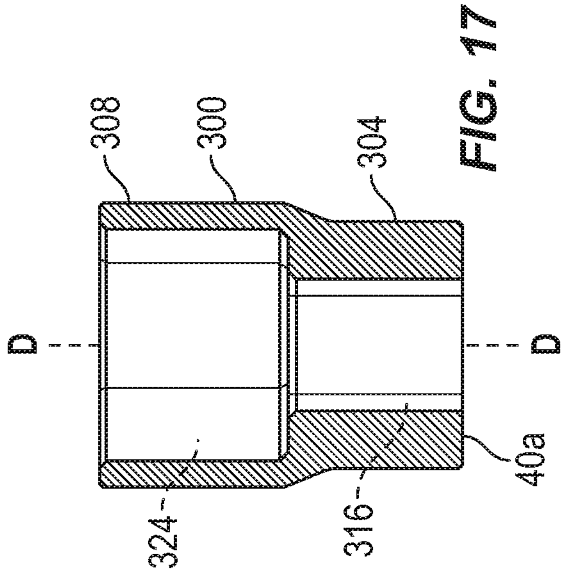
FIG. 17 is a section view of one of the tool accessories of FIG. 1A, FIG. 1B, and FIG. 1C.
Figure 19:
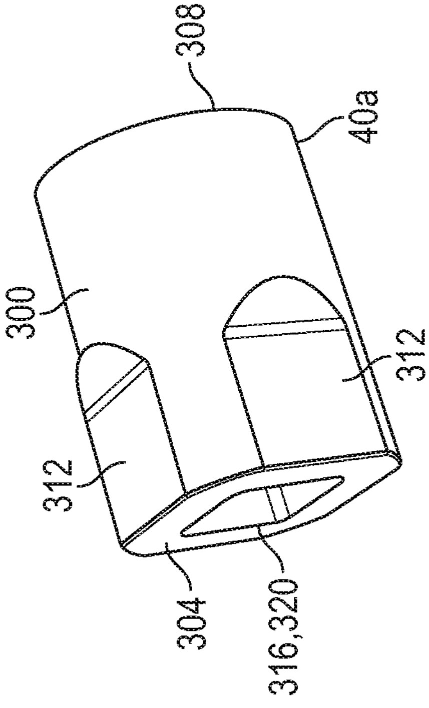
FIG. 19 is another perspective view of the tool accessory FIG. 17.
Figure 21:
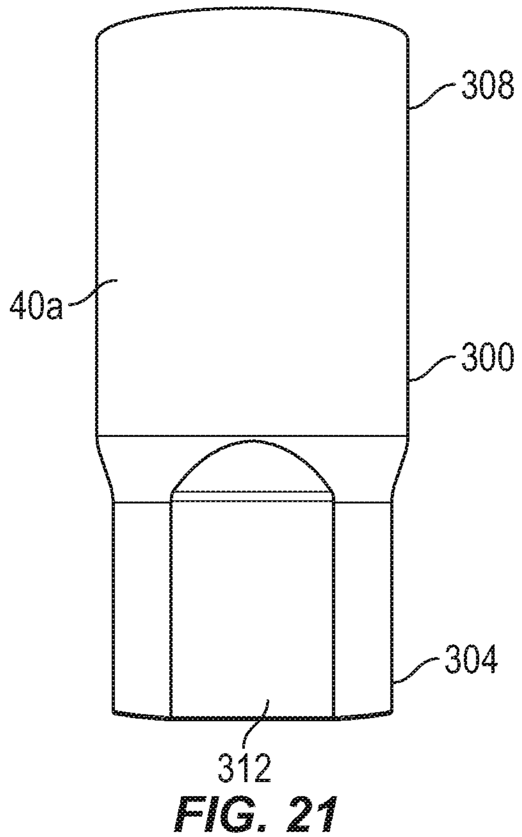
FIG. 21 is a side view of another of the tool accessories of FIG. 1A, FIG. 1B, and FIG. 1C.
Figure 22:
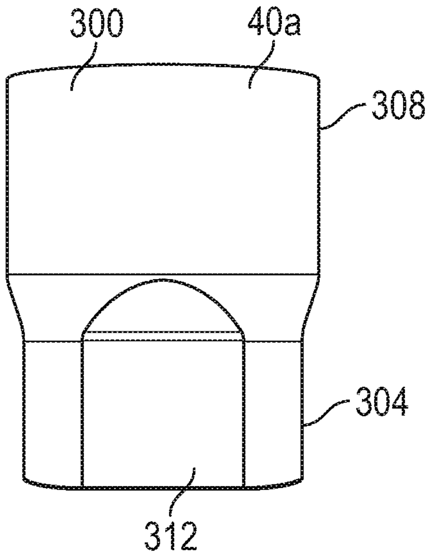
FIG. 22 is a side view of another of the tool accessories of FIG. 1A, FIG. 1B, and FIG. 1C.
Figure 23:
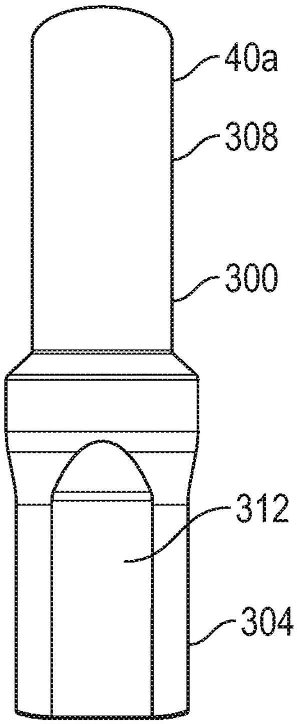
FIG. 23 is a side view of another of the tool accessories of FIG. 1A, FIG. 1B, and FIG. 1C.
Figure 24A:
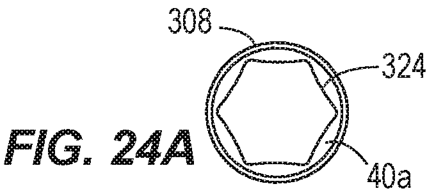
FIG. 24A is a view from an end of one of the socket accessories of FIG. 24B.
Figure 24B:
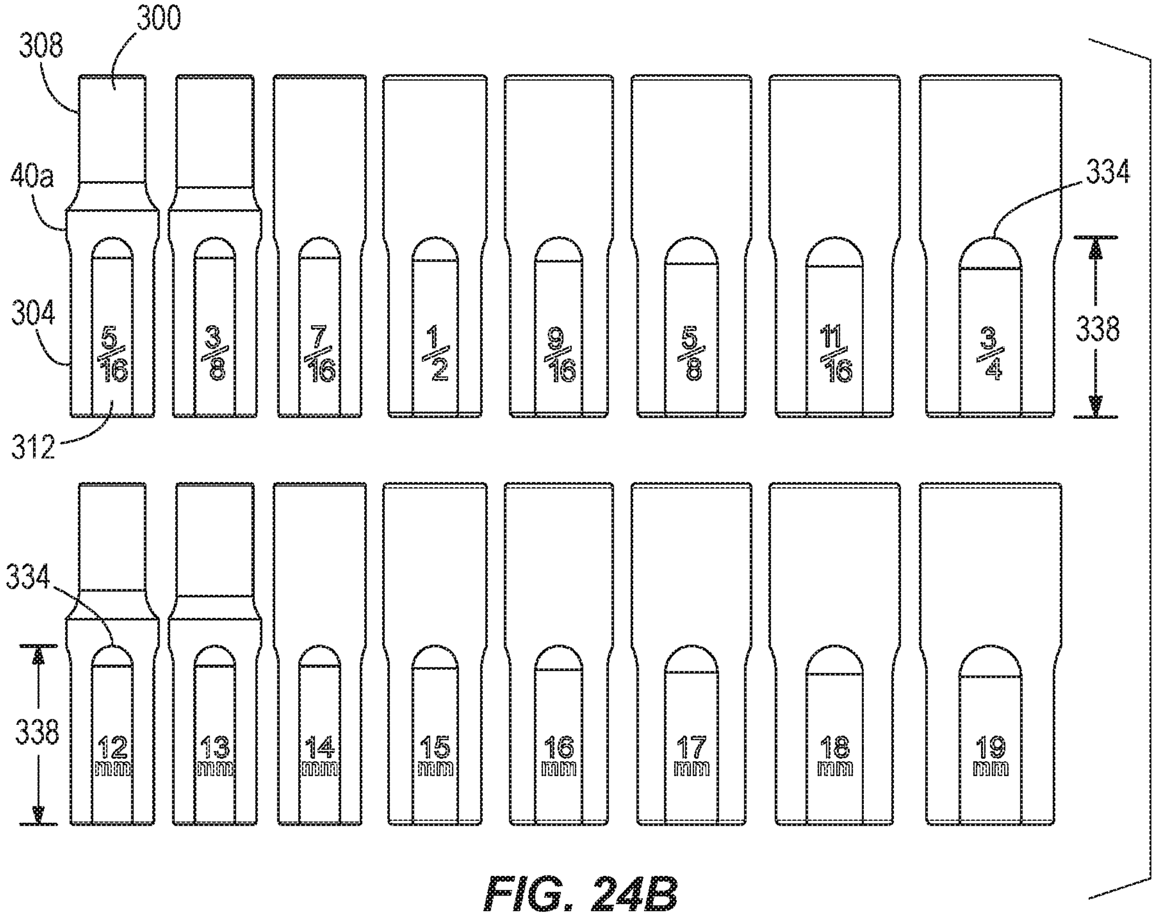
FIG. 24B is a side view of the tool accessories where the tool accessories are socket accessories.

FIGS. 18, 24*a*, and 27 illustrate apertures 324 that have six points of contact (i.e., the apertures 324 are hexagonal apertures), however, other socket accessories 40*a* may have apertures 324 with any suitable number of points of contact.

Each socket accessory 40*a* is manufactured by starting with a cylindrical socket accessory (not shown) in which the center of mass 330 is closer to the first end 304 than the second end 308. A cylindrical first end (not shown) with a square drive (like the ones shown in FIG. 19) has more metal and thus more mass than the cylindrical second end 308. Accordingly, removing portions of the exterior near the cylindrical first end creates the side faces 312 on the first end 304. The side faces 312 extend beyond the center of mass 330 such that an end 334 of each side face 312 (e.g., defined on the second section 312*b*) that is opposite the square drive 320 becomes a tipping point 321 such that the socket accessory 40*a* always tips onto one of the side faces 312 (e.g., the first section 312*a*) to prevent rolling. The location of the end 334 of each side face 312 also depends on the need for strength because the side faces 312 of each of the socket accessories also result in less material and thus less strength adjacent the first end 304. Accordingly, the location of the end 334 of each side face 312 depends both on the position of the center of mass 330 and the need for strength. In the embodiment illustrated in FIGS. 7 and 17-24, each side face 312 has a length 338 of about 1.1 inches (about 28 mm). The length 338 may vary, however, and therefore, measure between 0.78 inches and 1.4 inches (about 20 mm and 36 mm). For example, the length 338 of the side face 312 of the embodiment illustrated in FIGS. 26-28 is longer than the length 338 of the side face 312 of the embodiment illustrated in FIGS. 7 and 17-24. The center of mass 330 is effected when material is removed to create the side faces 312 as well as by the interior shape and relative amount of metal at each of the first and the second ends 304, 308 of each socket accessory 40*a*. Accordingly, the center of mass 330 can always be calculated to guarantee that the center of mass 330 is between the square drive 320 and the end 334 of the side face 312.

Figure 25:
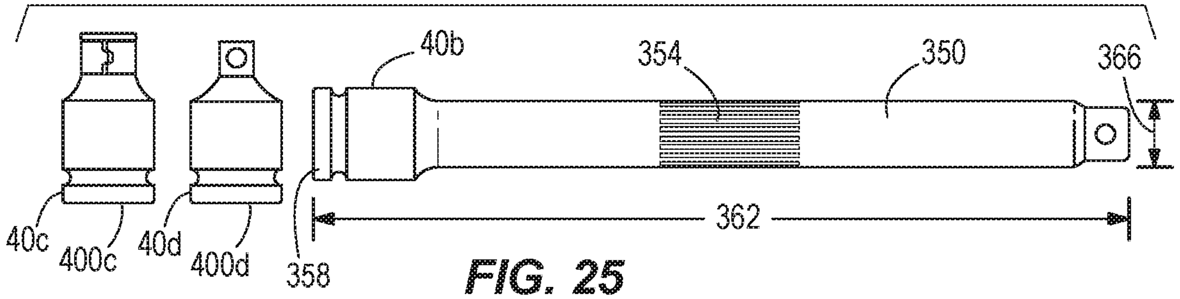
FIG. 25 shows side views of the tool accessories where the tool accessories are a first adapter accessory, a second adapter accessory, and an extension accessory.

As illustrated in FIG. 25, the extension accessory 40*b* includes an elongated body 350. The body 350 includes recesses 354 and an end 358 that defines an aperture (not shown). The aperture defines a square opening or drive that is sized and shaped to complement and receive the apertures 320 of each of the socket accessories 40*a*. The extension accessory 40*b* has a length 362 of about 6 inches (about 153 mm) and a diameter 366 of about 0.5 inches (about 12 mm), although the length 362 may be between about 4 inches and 10 inches (about 102 mm and 254 mm) and the diameter 366 may be about 0.25 inches to about 0.75 inches (about 6 mm and 20 mm).

Further with respect to FIGS. 25, the first adapter accessory 40*c* is a bit adapter that is used for holding bits, such as Phillips, flat head, or any other type of bit. In the illustrated embodiment, the second adapter accessory 40*d* is a ⅜ inch to ¼ inch adaptor for adapting sizes. In additional or alternative embodiments, there may be other or additional adapter accessories. Each of the first and the second adapter accessories 40*c*, 40*d* includes an end 400*c*, 400*d* that defines an aperture (not shown) that is sized and shaped to complement and receive the aperture 320 of each of the socket accessories.

When not in use, the ratchet 30 and the accessories 40 are stored in the container 10. In particular, the ratchet 30 is stored in the first retainer 140 and the extension accessory 40*b* is stored in the second retainer 144. Further, each of the socket accessories 40*a*, the first adapter accessory 40*c*, and the second adapter accessory 40*d* are secured to one of the projections 80 of the container 10. In particular, each of the projections 80 of the container 10 is received by the square aperture 320 of one of the plurality of accessories. Accordingly, each of the socket accessories 40*a*, the first adapter accessory 40*c*, and the second adapter accessory 40*d* is secured such that the longitudinal axis D is aligned with the longitudinal axis B of corresponding projection 80. In other words, each of the socket accessories 40*a*, the first adapter accessory 40*c*, and the second adapter accessory 40*d* is stored in a standing position on the middle portion 58 of the container 20.

For storage and transportation purposes, the container 10 is closed (i.e., moved to the second position), via the fastener 180, to enclose the ratchet 30 and the plurality of accessories 40 therein. As shown in FIGS. 1*a*, 5, 7, and 8, the middle portion 58 has a sufficient width 192 that allows the container 10 to be stored in one of several upright positions. For example, the container 20 can be stored on a surface such that the longitudinal axis A is parallel to the surface. Accordingly, the middle portion 58 can support the container 20 such that the accessories 40*a*, 40*c*, 40*d* face upward. Alternatively, a side of the container 20 opposite the middle portion 58 can support the container 20 such that the accessories 40*a*, 40*c*, 40*d* face downward. In another upright position shown in FIG. 7, the container can also be stored such that the longitudinal axis A is perpendicular to a surface. In any of the possible upright positions, shelf space is saved because the ratchet 30 and each of its accessories 40 is contained within the container 20, which can be stored like a binder or book on a bookshelf. The container also promotes efficiency because the accessories 40*a*, 40*c*, 40*d* can be kept organized by size. A user may obtain access to the ratchet 30 and the plurality of accessories 40 by opening the container 10 (i.e., moving the container 10 to the open position), via the fastener 180.

Various features of the invention are set forth in the following claims.

What is claimed is:

1. A tool kit, comprising:

a set of tool accessories, the tool accessories each including a drive end that is configured to be coupled to a tool head, and a working end opposite the drive end, each of the tool accessories comprising:

a first section including the drive end and a first aperture located at the drive end;

a second section including the working end and a second aperture located at the working end;

a tipping axis extending from the drive end to the working end;

a tipping point disposed between the first portion and the second portion; and a center of mass defined at a location closer to the drive end than the working end such that, when the tool accessory is rested on a surface with the tipping axis oriented in a horizontal direction, the center of mass causes the tool accessory to tip at the tipping point and to rest on a portion of the first section; and a container that is movable between an open position and a closed position, the container including:

a first portion;

a second portion connected to the first portion; and a plurality of projections aligned between the first portion and the second portion along a longitudinal axis, wherein each of the tool accessories are coupled to one of the plurality of projections;

wherein, in the open position, the tool accessories extend away from both the first portion and second portion, and wherein, in the closed position, the tool accessories extend along the first and second portions of the container; and wherein, in the closed position, the first portion is coupled to the second portion around at least two sides of an outer edge of the first portion.

2. The tool kit of claim 1, further comprising:

a tool including a handle and a tool head; and a retainer located on the first portion that supports the tool in a position such that the handle of the tool is oriented parallel to the longitudinal axis.

3. The tool kit of claim 1, wherein each of the plurality of projections defines a longitudinal projection axis, wherein the longitudinal projection axis of each of the plurality of projections is aligned with the tipping axis of the tool accessory coupled to the projection.

4. The tool kit of claim 3, wherein the plurality of projections extend perpendicular to the longitudinal axis of the container.

5. A tool kit, comprising:

a tool including a handle and a tool head;

a set of tool accessories, the tool accessories each including a drive end configured to be coupled to the tool head and a working end opposite the drive end, each of the tool accessories comprising:

a first section including the drive end and a first aperture located at the drive end;

a second section including the working end and a second aperture located at the working end;

a tipping axis extending from the drive end to the working end;

a tipping point disposed between the first portion and the second portion; and a center of mass defined at a location closer to the drive end than the working end such that, when the tool accessory is rested on a surface with the tipping axis oriented in a horizontal direction, the center of mass causes the tool accessory to tip at the tipping point and to rest on a portion of the first section; and a container including:

a first portion including a first retainer that supports the tool;

a second portion;

a middle portion connecting the first portion and the second portion;

a plurality of projections extending from the middle portion, wherein each of the tool accessories is coupled to one of the plurality of projections;

a first folding hinge on a first side of the middle portion; and a second folding hinge on a second side of the middle portion, opposite the first side, wherein the container is moveable between an open position and closed position by pivoting the first portion and the second portion along the first folding hinge and the second folding hinge, respectively;

wherein, when in the closed position, a width of the middle portion is substantially the same as a distance between the first portion and the second portion.

6. The tool kit of claim 5, wherein the plurality of projections are coupled to an inner surface of the middle portion.

7. The tool kit of claim 6, wherein the middle portion defines a longitudinal axis, wherein the plurality of projections are aligned along the longitudinal axis and the first hinge and second hinge are parallel to the longitudinal axis.

8. A socket accessory kit, comprising:

a set of socket accessories each configured to be couple to a tool head, each socket accessory comprising:

a first section comprising a first end and a first aperture located at the first end, the first aperture configured to receive a tool head;

a second section comprising a second end and a second aperture located at the second end, the second aperture configured to receive and to engage a work piece;

a tipping axis extending from the first end to the second end;

a tipping point disposed between the first section and the second section; and a center of mass defined at a location closer to the first end than the second end such that, when the socket accessory is rested on a surface with the tipping axis oriented in a horizontal direction, the center of mass causes the socket accessory to tip at the tipping point and to rest on a portion of the first section; and a container, the container including a first portion connected to a second portion, and a plurality of projections, the plurality of projections aligned between the first portion of the container and the second portion of the container, wherein each of the socket accessories are coupled to one of the plurality of projections.

9. The socket accessory kit of claim 8, further comprising:

a tool including a handle and a tool head; and a retainer located on the first portion that supports the tool.

10. The socket accessory kit of claim 8, wherein each socket accessory includes a wall portion located between and transitioning from the second section to the first section; an outer cross-sectional dimension of the second section perpendicular to the tipping axis; and an outer cross-sectional dimension of the first section perpendicular to the tipping axis, wherein the outer cross-sectional dimension of the second section is greater than the outer cross-sectional dimension of the first section.

11. The socket accessory kit of claim 10, wherein the wall portion is an angled wall portion that transitions from the greater outer cross-sectional dimension of the second section to the outer cross-sectional dimension of the first section.

12. The socket accessory kit of claim 11, wherein, for each socket accessory, the tipping point is defined at an intersection of the wall portion and the second section.

13. The socket accessory kit of claim 12, wherein, for each socket accessory, a length of the first section in the direction of the tipping axis is less than a length of the second section in the direction of the tipping axis.

14. The socket accessory kit of claim 12, wherein, for each socket accessory, the wall portion includes at least one planar, angled side surface section extending between the first section and the second section.

15. The socket accessory kit of claim 11, each socket accessory further includes a cylindrical portion that extends from the second end towards the first end, wherein the first aperture is a square opening configured to receive a ratchet and the second aperture is defined by at least six flat sides located at the second end configured to engage a fastener.

16. The socket accessory kit of claim 15, wherein each of the plurality of projections includes a square outer perimeter sized to fit within the square opening of each socket accessory.

17. The socket accessory kit of claim 8, wherein each of the plurality of projections defines a longitudinal projection axis, wherein the longitudinal projection axis is aligned with the tipping axis of the socket accessory coupled to the projection.

18. The socket accessory kit of claim 17, wherein the plurality of projections extend perpendicular to the longitudinal axis of the container.

19. A tool kit, comprising:

a set of tool accessories, the tool accessories each including a drive end that is configured to be coupled to a tool head, and a working end opposite the drive end; and a container that is movable between an open position and a closed position, the container including:

a first portion;

a second portion connected to the first portion; and a plurality of projections aligned between the first portion and the second portion along a longitudinal axis, wherein each of the tool accessories are coupled to one of the plurality of projections;

wherein, in the open position, the tool accessories extend away from both the first portion and second portion, and wherein, in the closed position, the tool accessories extend along the first and second portions of the container; and wherein, in the closed position, the first portion is coupled to the second portion around at least two sides of an outer edge of the first portion; and wherein each of the plurality of projections defines a longitudinal projection axis; and each of the tool accessories include a tipping axis extending from the drive end to the working end, wherein the longitudinal projection axis of each of the plurality of projections is aligned with the tipping axis of the tool accessory coupled to the projection.

20. The tool kit of claim 19, wherein the plurality of projections extend perpendicular to the longitudinal axis of the container.

* * * * *